June 18, 1968   B. E. SEWARD   3,388,613
PEDAL FOOT RETAINER
Filed July 18, 1966

INVENTOR
BASIL E. SEWARD
BY

3,388,613
PEDAL FOOT RETAINER
Basil E. Seward, 801 S. 52nd St., Apt. 1605,
Omaha, Nebr. 68106
Filed July 18, 1966, Ser. No. 565,958
5 Claims. (Cl. 74—562)

This invention relates to accelerator pedal foot retainers, and more particularly it is an object to provide a foot retainer which can be much more rapidly attached than retainers of prior art.

A particular object is to provide a retainer which is so readily attachable that it can serve as a good-will giveaway item, and further it is an object to provide a retainer with an advertising receiving portion on which the name of a company giving away the retainer can be placed.

Another object is to provide a foot retainer which is adapted to cling to an accelerator pedal by spring pressure.

A further object is to provide a foot retainer, the majority parts or all parts of which can be economically manufactured from a single piece of wire.

A further object is to provide a foot retainer which can be attached to a foot pedal quickly without the use of tools by persons whose mechanical talent is at a minimum.

Figure 1:
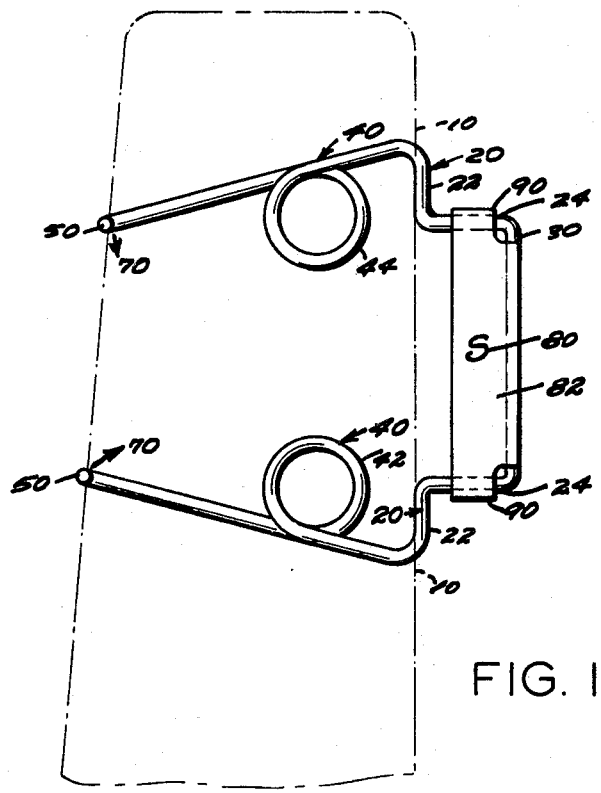
FIGURE 1 is a top plan view of the pedal foot retainer of this invention shown in full lines, with an automobile accelerator pedal to which it is attached being shown in dotted lines.
Figure 2:
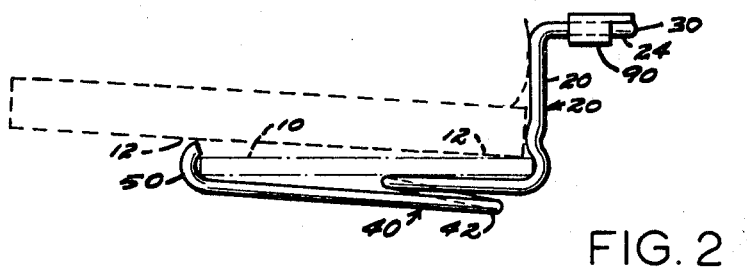
FIGURE 2 is a side elevation of the pedal foot retainer with the accelerator pedal and a portion of the shoe of a motorist being shown in dotted lines.

An accelerator pedal is shown at 10 and a portion of a shoe of a person is indicated in dotted lines at 12 resting upon the top of the pedal 10, as best seen in FIGURE 2.

In order to retain a driver's foot on the pedal 10, a retainer 20 is provided having two upwardly extending portions 22 which tend to engage the side of the operator's shoe preventing his foot from slipping off the pedal except in the direction of the brake. The retainer 20 is used on the side of the accelerator pedal 10 which is opposite the brake.

The two upright portions 22 are attached to two generally horizontally extending portions 24, the outer ends of which are interconnected by a horizontal portion 30, the portions 22, 24, and 30, all being integrally made, preferably of the same piece of wire.

The upright portions 22 and the resilient means 40 are preferably of spring-loop shape and interconnect the upwardly extending portions 22 with hooks 50 which hook around the opposite side of the pedal 10.

Since the springs or resilient portions 40 bias the hooks 50 inwardly in the direction of the arrow 70, a good grip is obtained and an adaptability to different widths of the pedal 10.

Advertising 80 can be placed on a metal plate 82 which is fixed to the top of the horizontal portions 24 and has tabs 90 which extend downwardly and wrap around the portions 24.

From the foregoing description, it is thought to be obvious that a pedal foot retainer constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:
1. A foot retainer for attachment to an accelerator pedal comprising: two generally upwardly extending portions adapted to be disposed above one side of an accelerator pedal for engaging the edge of the shoe of an operator, means connecting said upwardly extending portions to form a unit, an attachment means connected to said unit on a lower portion of said unit and extending transverse to said upwardly extending portions for extending under an accelerator pedal, said attachment means having upwardly extending grip portions disposed in positions horizontally spaced from said upwardly extending shoe retaining portions whereby they are adapted to grip the opposite side of said pedal, said attachment means further having pressing portions serving to draw said grip portions toward said shoe retaining portions for clamping said accelerator pedal therebetween.

2. The combination of claim 1 in which said pressing portions are formed of coiled springs.

3. The combination of claim 1 in which all of the retainer above described is formed of a single piece of wire.

4. The combination of claim 1 in which said upwardly extending foot retainer portions have offset intermediate portions for engaging the upper side of the respective edge of an accelerator pedal, said intermediate portions being offset toward said grip portions a sufficient distance for hooking about the said edge of said pedal but not to an extent such that they would substantially interfere with normal operation of the pedal.

5. The combination of claim 1 in which said retainer has an advertising support member disposed in a position extending transversely to said foot retainer portions, and means attaching said advertising support member to said foot retainer portions.

References Cited

UNITED STATES PATENTS

| | | | |
|---|---|---|---|
| 1,432,379 | 10/1922 | Bischoff | 74—560 X |
| 3,065,649 | 11/1962 | Stringer | 74—560 |
| 3,237,479 | 3/1966 | Peterson | 74—562 |

FRED C. MATTERN, Jr., *Primary Examiner.*

J. S. CORNETTE, *Assistant Examiner.*